(12) United States Patent
Fehner (10) Patent No.: US 10,553,987 B2
(45) Date of Patent: Feb. 4, 2020

(54) ELECTRIC CONNECTION DEVICE

(71) Applicant: VOLKSWAGEN AKTIENGESELLSCHAFT, Wolfsburg (DE)

(72) Inventor: Henrik Fehner, Bremen (DE)

(73) Assignee: Volkswagen Aktiengesllschaft, Wolfsburg (DE)

( * ) Notice: Subject to any disclaimer, the term of this patent is extended or adjusted under 35 U.S.C. 154(b) by 215 days.

(21) Appl. No.: 15/548,430

(22) PCT Filed: Dec. 22, 2015

(86) PCT No.: PCT/EP2015/080940
§ 371 (c)(1),
(2) Date: Aug. 3, 2017

(87) PCT Pub. No.: WO2016/124298
PCT Pub. Date: Aug. 11, 2016

(65) Prior Publication Data
US 2018/0026248 A1    Jan. 25, 2018

(30) Foreign Application Priority Data
Feb. 4, 2015 (DE) .................. 10 2015 201 881

(51) Int. Cl.
*H01R 13/533* (2006.01)
*H01M 2/10* (2006.01)
(Continued)

(52) U.S. Cl.
CPC ........ *H01R 13/533* (2013.01); *H01M 2/1072* (2013.01); *H01M 2/20* (2013.01);
(Continued)

(58) Field of Classification Search
CPC .. H01R 2201/26; H01R 13/74; H01R 13/405; H01R 13/506; H01R 13/518;
(Continued)

(56) References Cited

U.S. PATENT DOCUMENTS 4,555,451 A * 11/1985 Harrod .................. H01M 2/348
429/1
4,637,965 A * 1/1987 Davis ................... H01R 11/287
429/1
(Continued)

FOREIGN PATENT DOCUMENTS

DE      10249437 A1    6/2004
DE      60120813 T2    2/2007
(Continued)

*Primary Examiner* — Edwin A. Leon
*Assistant Examiner* — Milagros Jeancharles
(74) *Attorney, Agent, or Firm* — Laurence A. Greenberg; Werner H. Stemer; Ralph E. Locher (57) ABSTRACT

A reliable contact is produced in a simple and inexpensive manner for an internal electric device surrounded by a housing. An electric connection device for a housing element of the housing has at least one external electric connection element on the housing element for connecting a supply line of the internal electric device to an external electric device outside the housing. At least one line section, electrically connected to the external electric connection element on one side, and at least one terminal element, connected to the line section on the other side, connect to the supply line of the internal electric device. The external electric connection element, the at line section, and the terminal element are fixed on the housing element, and the terminal element is an inner face of the housing element and accessible from an outer face in a vicinity of an assembly opening in the housing element.

10 Claims, 7 Drawing Sheets

(51) Int. Cl.
*H01M 2/20* (2006.01)
*H01R 13/405* (2006.01)
*H01R 13/52* (2006.01)
*B60K 1/04* (2019.01)

(52) U.S. Cl.
CPC ....... *H01R 13/405* (2013.01); *H01R 13/5213* (2013.01); *B60K 1/04* (2013.01); *H01M 2220/20* (2013.01)

(58) Field of Classification Search
CPC ..... H01R 13/5213; B60L 53/14; B60L 53/16; B60K 1/04; B60R 16/02; H01M 2/201; H01M 2220/20; H02G 3/00
See application file for complete search history.

(56) References Cited

U.S. PATENT DOCUMENTS

| | | | | |
|---|---|---|---|---|
| 4,684,580 A | * | 8/1987 | Cramer | H01M 10/122 429/149 |
| 4,808,495 A | | 2/1989 | Goldstein | |
| 4,885,524 A | * | 12/1989 | Wilburn | H01M 2/305 320/105 |
| 4,904,198 A | * | 2/1990 | Begitschke | H01R 13/53 439/184 |
| 5,315,062 A | | 5/1994 | Hoshino | |
| 5,389,462 A | * | 2/1995 | Lin | H01M 2/043 429/121 |
| 5,494,459 A | * | 2/1996 | Brown | B60K 1/04 439/500 |
| 5,643,693 A | * | 7/1997 | Hill | H01M 2/1083 429/121 |
| 6,010,804 A | * | 1/2000 | Barksdale | B60R 16/04 429/100 |
| 6,693,370 B2 | | 2/2004 | Yamane et al. | |
| 6,869,309 B2 | * | 3/2005 | Ziegler | H01R 13/6397 439/456 |
| 7,057,306 B2 | | 6/2006 | Belschner et al. | |
| 7,469,759 B2 | | 12/2008 | Botzelmann | |
| 8,235,732 B2 | * | 8/2012 | Garascia | H01M 2/1077 439/500 |
| 8,309,244 B2 | | 11/2012 | Heidenbauer | |
| 8,795,862 B2 | * | 8/2014 | Marukawa | H01M 2/1072 307/10.7 |
| 9,553,288 B2 | * | 1/2017 | Paramasivam | H01M 2/1083 |
| 2010/0124693 A1 | | 5/2010 | Kosugi et al. | |
| 2012/0328916 A1 | | 12/2012 | Enning | |
| 2014/0077819 A1 | | 3/2014 | Stark | |
| 2015/0079454 A1 | * | 3/2015 | Maguire | H01M 2/1083 429/159 |
| 2015/0280182 A1 | * | 10/2015 | Gibeau | H01M 2/34 429/97 |
| 2016/0056429 A1 | * | 2/2016 | Paramasivam | H01M 2/1083 429/159 |
| 2016/0141569 A1 | * | 5/2016 | Mascianica | H01M 10/647 429/99 |
| 2018/0233789 A1 | * | 8/2018 | Iqbal | H01M 10/625 |

FOREIGN PATENT DOCUMENTS

| | | |
|---|---|---|
| DE | 102008024007 A1 | 12/2009 |
| DE | 102010009732 A1 | 9/2011 |
| DE | 102011110694 A1 | 2/2013 |
| JP | 2006278378 A | 10/2006 |
| JP | 201097722 A | 4/2010 |
| JP | 201487245 A | 5/2014 |
| KR | 1020130016093 A | 2/2013 |
| WO | 0160655 A1 | 8/2001 |
| WO | 2008034560 A1 | 3/2008 |

* cited by examiner

ELECTRIC CONNECTION DEVICE

BACKGROUND OF THE INVENTION

Field of the Invention

The invention relates to an electrical connecting device. The invention furthermore relates to a housing element having such an electrical connecting device. The invention further relates to a housing having such a housing element. The invention moreover relates to an internal electrical device, in particular a traction battery, having such a housing. The invention finally relates to an electrically operable, preferably drivable, vehicle having such an internal electrical device.

PRIOR ART

Printed publication WO 01/60655 A1 discloses a vehicle having a fuel cell for generating energy. The vehicle has a monitoring and switching unit which is detachably fastened, in a separate housing, to a fuel cell housing. This housing has a bushing for a branch to a low-voltage network and bushings having easily detachable contact means in or on its housing wall for line connections to sensors for detecting operating states. Arranged in a housing wall, in the lower part of the housing, are plug connectors with connections for lines by means of which the control and evaluation unit is connected to the sensors and the electrical line networks, wherein the separate housing can be detachably fastened, as a cover for an opening, to the housing which can be fastened to the fuel cell housing. The plug connectors are connected to the housing wall in a dust- and water-tight manner. A cover of the housing also covers its side walls and has openings in the region of the plug connectors. The control and evaluation unit forms a unit which can be handled on its own and which can also be installed and dismantled without disconnecting the central monitoring and switching unit, i.e. the unit can also be produced, tested, stored and transported.

Printed publication WO 2008/034560 A1 discloses a high-voltage battery which comprises a number of cylindrical cells arranged in series, a supporting structure for the cells and a cover plate on which high-current connectors for the individual cells and a cell monitoring unit are mounted. To reduce production, assembly and logistics costs, the cover plate is constructed as a multilayer printed circuit board having at least two conductive layers, the first of which is mounted on the side of the printed circuit board which faces the cells and has a considerable thickness for the purpose of forming the high-current connectors and the second layer of which has a small thickness and forms the connecting lines to the cell monitoring unit, wherein the two layers are connected to one another at certain points by means of bores which are designed to be conductive and pass through the printed circuit board. Upwardly directed connectors for connection to a high-current network and a plug connection for connection to or of a cell monitoring unit or a unit for battery management are arranged on the supporting structure. The cover plate can be inserted, fully assembled, into the supporting structure or placed on the cells. The high-current connectors produced from the thick conductive layer lie on the poles of the cells without further fastening elements. During assembly, the cover plate therefore only needs to be placed onto the supporting structure and the battery is ready for use.

However, the above-mentioned printed publications do not demonstrate the manner in which electrical contacting could be produced in a closed housing, in particular a housing closed in a gas- and/or fluid-tight manner, of an internal electrical device surrounded thereby, preferably a traction battery of an electrically operable, preferably drivable, vehicle.

SUMMARY OF THE INVENTION

The object of the invention is to create contacting which can be produced in a simple, economical and operationally reliable manner in such an internal electrical device surrounded by a housing.

This object is achieved by an electrical connecting device for a housing element of a housing of an internal electrical device arranged in the housing, in particular a traction battery, preferably for an electrically operable, preferably drivable, vehicle, comprising:
  at least one external electrical connecting element, arranged on the housing element, for connecting at least one supply line of the internal electrical device to at least one external electrical device arranged outside the housing
for which
  at least one line section electrically connected on one side to the at least one external electrical connecting element and
  at least one connector element connected on the other side to the at least one line section for connecting the at least one supply line of the internal electrical device thereto are provided, wherein
  the at least one external electrical connecting element, the at least one line section and the at least one connector element are fixedly arranged on the housing element and
  the at least one connector element is arranged on an inside of the housing element in the region of at least one assembly opening in the housing element such that it is accessible from an outside of the housing.

The electrical connecting device according to the invention therefore achieves the object of creating, in a simply producible manner, an electrical connection between the at least one supply line of the internal electrical device, which is located inside the housing, and the at least one external electrical connecting element, which can in turn be connected to the at least one external electrical device. The electrical connecting device comprises the at least one external electrical connecting element, the at least one line section, which is connected on one side, i.e. at one of its ends, to the at least one external electrical connecting element, and the at least one connector element, which is connected on the other side, i.e. to at least one other end of the at least one line section, to this latter. The at least one connector element is then constructed for connecting at least one supply line of the internal electrical device thereto. According to the invention, therefore, an electrical connection between the at least one external electrical device and the internal electrical device is formed, which is realized via the at least one external electrical connecting element, the at least one line section, the at least one connector element and the at least one supply line.

For an assembly procedure of the housing element on the housing, it is particularly advantageous that, according to the invention, the at least one external electrical connecting element, the at least one line section and the at least one connector element are fixedly arranged on the housing element, i.e. fixedly combined to form a module on and/or with the housing element or integrated in the housing element. This enables easy and precise handling during the assembly procedure. Furthermore, the at least one assembly opening, the at least one supply line of the internal electrical device and the at least one connector element are preferably positioned at least virtually immediately adjacent to one another in the built assembly state of the housing element on the housing so that at least virtually no further change in position of the at least one supply line and/or the at least one connector element has to be realized to produce the at least one connection of the at least one supply line to the at least one connector element. In this position, the at least one connector element—together with the at least one supply line—is arranged in the interior of the housing, behind and/or in the at least one assembly opening, such that it is accessible through the at least one assembly opening, i.e. such that it can be accessed through the at least one assembly opening such that the assembly, i.e. an electrical connection of the at least one supply line to the at least one connector element, can be carried out.

Furthermore, only a single assembly opening is preferably provided for one or more connector elements together, so that the design of the housing element can be made as simple as possible. It is optionally possible for at least one assembly opening to also or only be provided in the housing instead of in the housing element. In a case in which the housing is constructed for example in the manner of a trough and the housing element to this end forms a hood-like closure, at least one assembly opening can be formed in the trough and/or the hub. A particularly advantageous construction is produced if a plurality of external electrical devices are to be connected to a plurality of supply lines of the internal electrical device via a plurality of external electrical connecting elements and a plurality of line sections and a plurality of connector elements are to be provided for this, because the construction according to the invention then enables a high degree of simplicity for the manufacturing procedure and the product produced. Therefore, for example, in the case of a traction battery, preferably for an electrically operable, preferably drivable, vehicle, an external electrical connecting element is provided in each case for each external electrical device for charging, for connecting an on-board power supply and for connecting a traction battery. In this case, one line section in each case leads from each of the external electrical connecting elements to a respective connector element. As a result of pre-assembling and thus fixedly building the housing element with the external electrical connecting elements, the line sections and the connector elements, it is only necessary to connect the easily-accessibly and compatibly positioned connector elements to the supply lines after joining the housing element and the rest of the housing together. This is substantially more simple, for example, than connecting the external electrical connecting elements individually to the line sections after connecting the housing element to the housing. In the construction according to the invention, both the at least one line section and the at least one supply line can be guided tautly, briefly and directly within the housing; it is possible to dispense with overlengths for handling during the production of the electrical connections and to therefore save on material and installation space. Moreover, protection against damage during the assembly procedure is increased. It is furthermore possible to dispense with touch protection at the at least one external electrical connecting element, i.e. at contact points between the at least one external electrical connecting element and the at least one line section, since, on the one hand, these contact points—especially when connecting a traction battery—only have a voltage applied once the housing element and the rest of the housing have been joined together and, on the other, are unable to touch overlengths of the type mentioned, for example. If need be, the at least one line section is advantageously equipped with an anti-twist device.

Advantageous configurations of the invention are characterized in the subclaims.

A preferred further development of the electrical connecting device according to the invention is characterized in that the at least one connector element connected on the other side to the at least one line section is directly connected to the at least one supply line of the internal electrical device, in particular by means of a plug and/or screw connection. An interconnection of further conductor structures, for example further line sections or the like between the at least one connector element on the one hand and the at least one supply line on the other is not required here. Advantageously, in the case of a construction with a screw connection, the at least one connector element is constructed with at least one screw in each case and the at least one supply line is constructed with at least one counter-thread in each case, particularly preferably with precisely one screw and precisely one counter-thread respectively. The installation and the assembly of the electrical connecting device according to the invention are thus further simplified.

In a further preferred embodiment of the electrical connecting device according to the invention, at least one of the at least one line sections is integrally formed in a material with which the housing element is constructed, in particular embedded and/or injection molded into a plastic material. This design enables the at least one line section, constructed in a manner which is damage-protected, compact, robust and simple, to be arranged on the housing element without the use of additional assembly devices or assembly elements. Smooth surfaces of the housing element are at least substantially maintained here and the at least one line section is installed on or in the housing element in a touch-protected and therefore short-circuit-protected manner. At least one of the at least one line sections is optionally fastened, for example bonded, clamped or the like, to the housing element with at least one holding element.

In a preferred further development of the electrical connecting device according to the invention, the at least one assembly opening in the housing element is constructed to be closable, in particular closable in a gas- and/or fluid-tight manner, preferably by at least one closing element, preferably by at least one cover-like closing element. This at least one, preferably precisely one, assembly opening is closed independently of the electrical connectors or connections or contacts, i.e. the electrical line or connecting elements described above are not touched in the course of the closing procedure. This facilitates the closing of the assembly opening in the same manner as the joining-together of the housing element with the rest of the housing is facilitated by the construction of the electrical connecting device according to the invention, which, likewise, can thus be realized independently of the production of the electrical connections described above, i.e. without touching these. The at least one cover-like closing element can advantageously furthermore be equipped with an internal-pressure equalizing element, which is constructed in particular for equalizing an overpressure in the housing. Assembling such an internal-pressure equalizing element on or in the closing element is realized more easily than assembling it on the housing or on the housing element.

A further preferred embodiment of the electrical connecting device according to the invention is characterized by at least one holding device for holding at least the at least one connector element through the at least one assembly opening in the housing element to the outside of the housing for assembling the housing element on the rest of the housing. For the assembly procedure, the at least one connector element, and optionally additionally at least one connecting part or at least one connecting portion of the at least one line section, therefore projects into and/or through the at least one assembly opening to the outside of the housing. The term "rest of the housing" here refers to that part or those components or portions of the housing which, possibly with the exception of the at least one closing element, form the entire housing as a result of being joined together with the housing element equipped with the connecting device according to the invention. In one example, the rest of the housing represents a trough-like structure which is joined together with a hood-like housing element to form the housing, e.g. by bonding, screwing or the like. The at least one holding device here can be optionally provided on the housing element and/or the rest of the housing permanently and/or temporarily, namely at least virtually only for the assembly procedure for joining together the housing element and the rest of the housing. The at least one holding device is preferably constructed for example in the manner of a support or clip or as a molded part on the housing element in the region of the at least one assembly opening or the like.

In a preferred further development of the electrical connecting device according to the invention, the at least one external electrical connecting element arranged on the housing element is designed for detachable connection, in particular pluggable connection, to the at least one external electrical device arranged outside the housing. In the example of a traction battery, a plurality of, in particular, different plugs for connection to different external electrical devices are particularly preferably provided, in particular for charging the traction battery, for an on-board power supply and for a traction drive. Each of the external electrical connecting elements, i.e. each of the plugs, is electrically connected to at least one of the at least one connector elements in each case by means of an, in particular, separate line section. The internal electrical device with the housing, e.g. the traction battery, is thus constructed as a compact module which is installed in a simple, robust and economical self-contained manner and which can be quickly and easily electrically connected to, and disconnected from, external electrical devices.

The above-mentioned object is furthermore achieved by a housing element having an electrical connecting device of the type described above. A housing element which is equipped in this way can be installed simply, quickly, precisely and reliably, i.e. joined together with the rest of a housing, whereby costs can be reduced and the manufacturing quality increased. Also, such a housing element is preferably suitable as an easily handled and, in particular, also transportable vendor part for a manufacturing facility, e.g. a manufacturing company for traction batteries.

The above-mentioned object is further achieved by a housing having such a housing element. This housing can be produced and joined together quickly, simply, flexibly and economically.

The above-mentioned object is moreover achieved by an internal electrical device, in particular a traction battery, preferably for an electrically operable, preferably drivable, vehicle, having such a housing. The above-mentioned object is finally achieved by an electrically operable, preferably drivable, vehicle having such an internal electrical device.

The internal electrical device and the vehicle equipped therewith have the above-described advantages here.

BRIEF DESCRIPTION OF THE DRAWINGS

An exemplary embodiment of the invention is illustrated in the drawing and will be described in more detail below, wherein corresponding elements are provided with the same reference signs in all figures and a description of these elements is not repeated. The drawings show.

PREFERRED EMBODIMENT OF THE INVENTION

Figure 1:
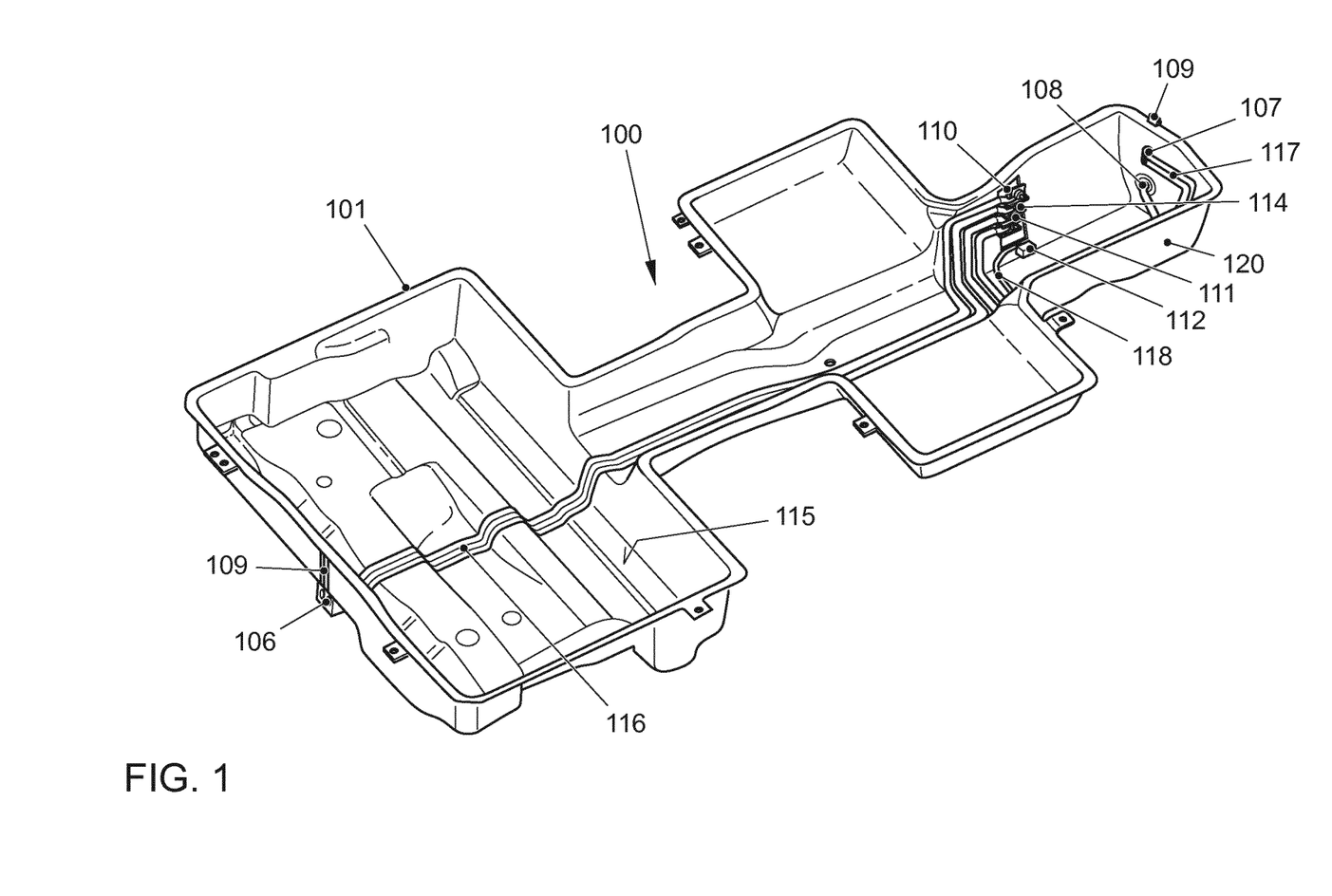
FIG. 1 an example of a housing element according to the invention, which is designed in the manner of a hood and is a housing element of a housing, constructed according to the invention, of a traction battery equipped according to the invention for an electrically drivable vehicle having an electrical connecting device according to the invention, in a perspective view from below.
Figure 5:
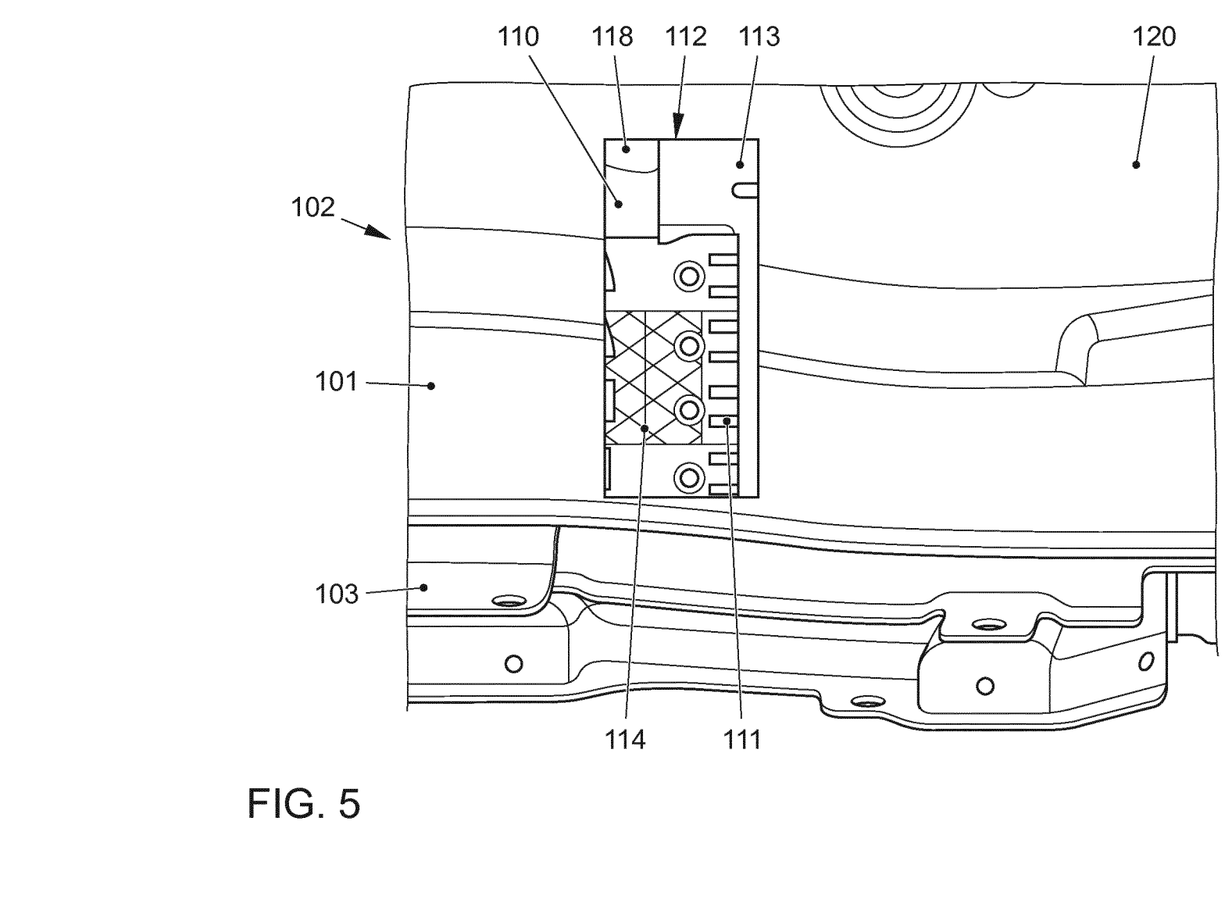
FIG. 5 an illustration of a detail of the housing, constructed according to the invention, of the traction battery equipped according to the invention, with a reproduction of an assembly opening and connector elements arranged in or behind it.
Figure 6:
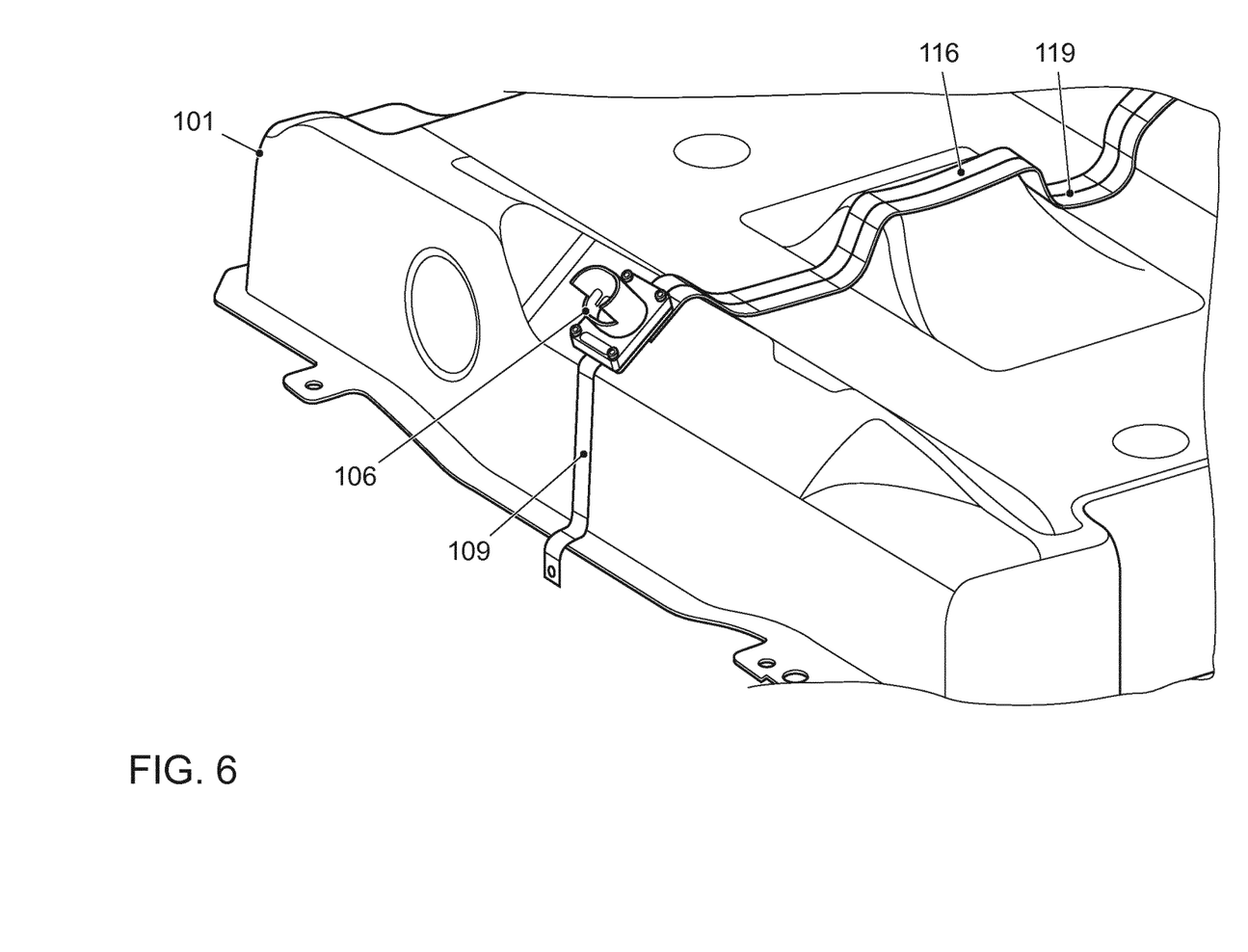
FIG. 6 a further detail of the example of the housing element of FIG. 1 in a perspective plan view, likewise illustrated in a phantom view.
Figure 7:
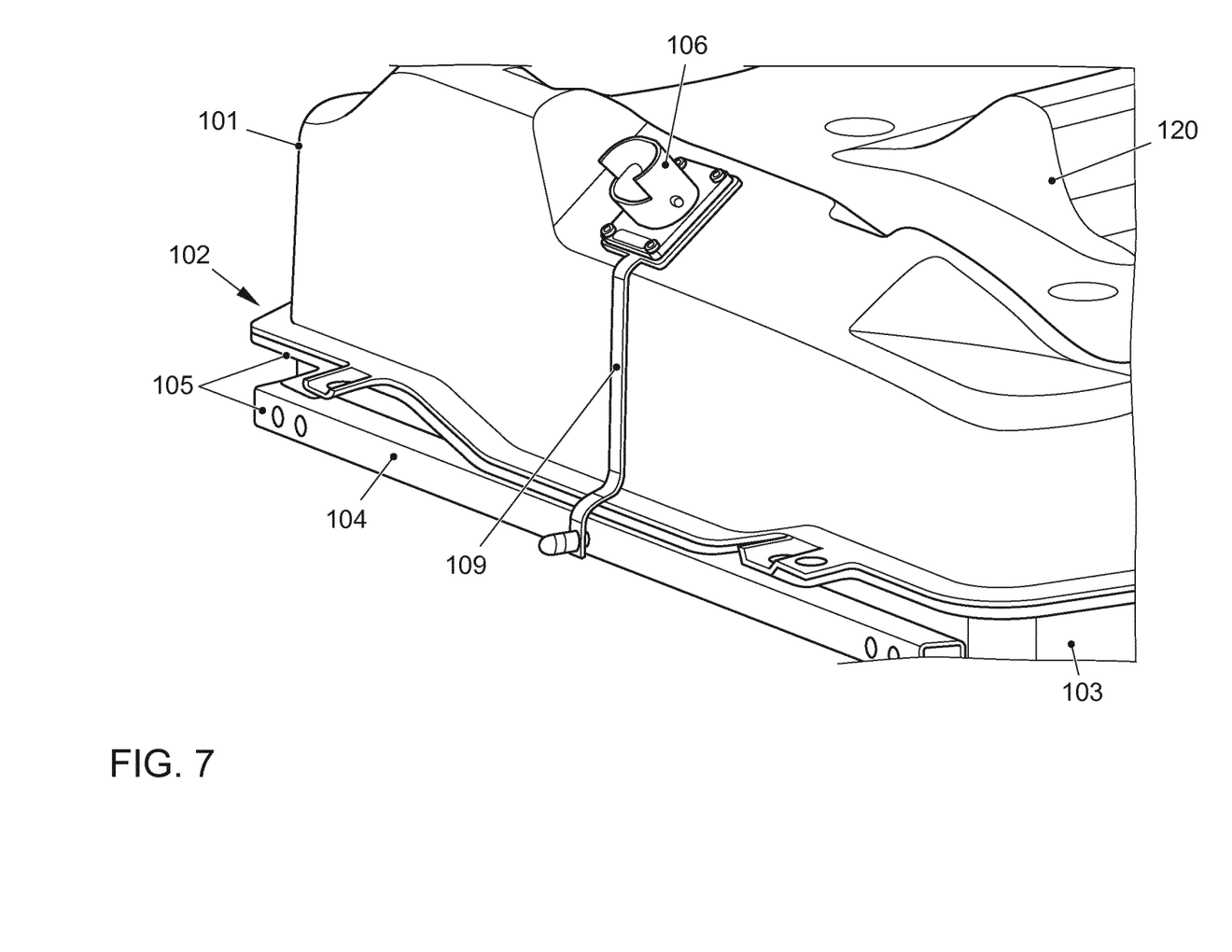
FIG. 7 the example of the housing constructed according to the invention according to the previous figures, illustrated in a perspective corresponding substantially to the view according to FIG. 6.

In FIG. 1, the reference sign 101 denotes an exemplary embodiment of a housing element which is shaped in the manner of a hood and is constructed to be joined together, in particular joined together in a gas- and/or fluid-tight manner, preferably bonded, with a housing lower shell 103, which is designed in the manner of a trough and is not of great significance to the further description of the exemplary embodiment of the invention, which is why only details thereof are reproduced in FIGS. 5 and 7. Together with a supporting frame 104, of which a detail is likewise only indicated in FIG. 7, the housing lower shell 103 forms the rest of a housing 105 and the rest of the housing 105 forms a housing 102 together with the housing element 101.

In the exemplary embodiment shown, the housing 102 is constructed to receive an internal electrical device, in particular a traction battery, preferably for an electrically operable, preferably drivable, vehicle. For this purpose, the housing element 101 is equipped with an electrical connecting device 100. This electrical connecting device 100 comprises a first external electrical connecting element 106, which is arranged on the housing element 101 and is designed for connection to a first external electrical device (not illustrated) arranged outside the housing 102 and constructed as a battery charging device, and which is referred to in short below as charging plug 106. The electrical connecting device 100 furthermore comprises a second external electrical connecting element 107, which is likewise arranged on the housing element 101 and is designed for connection to a second external electrical device (likewise not illustrated) arranged outside the housing 102 and constructed as a traction device, and which is referred to in short below as traction plug 107. The charging plug 106 and traction plug 107 are designed as high-voltage plugs. The electrical connecting device 100 moreover comprises a third external electrical connecting element 108, which is arranged on the housing element 101 and is designed for connection to a third external electrical device (in turn not illustrated) arranged outside the housing 102 and forming an on-board power supply of the vehicle, and which is referred to in short below as on-board power supply plug 108. In this exemplary embodiment, the charging plug 106, traction plug 107 and on-board power supply plug 108 are inserted in a gas-tight manner into apertures in the housing element 101, i.e. into its wall, so that the electrical connections produced thereby lead through the wall of the housing element 101 at this point. These plugs 106, 107, 108 preferably form a direct seal on a ground connection area 109, or a respective ground connection area 109, which produces an EMC shield termination to the housing element 101 and to the rest of the housing 105, in particular to its supporting frame 104. An electrically conductive lining of the housing element 101 and/or the housing lower shell 103, which serves to shield electromagnetic interferences, is advantageously connected to this ground connection area 109 or these ground connection areas 109 in an electrically conductive manner. This lining (not illustrated) can also be embedded in a preferably electrically insulating material of the housing element 101 and/or the housing lower shell 103, or the housing element 101 and/or the housing lower shell 103 are constructed with conductive material. It is optionally or alternatively possible to construct a design without an electromagnetic shield or only a partial shield and therefore also without a ground connection area or with a ground connection area which is constructed only in parts or in sections. The plugs 106, 107, 108 then optionally or alternatively form a direct seal on a preferably electrically insulating material of the housing elements 101.

An assembly opening 110 is provided in the wall of the housing element 101. A number of connector elements, which are accessible through the assembly opening 110 in the housing element 101 from an outside of the housing 102, are arranged in the region of this assembly opening 110, i.e. behind this here, in the spatial region enclosed by the housing element 101. Connector elements 111 provided for connecting the charging plug 106 and the traction plug 107 are combined here with electrically conductive contact elements for each of the connected external electrical connecting elements, i.e. the charging plug 106 and the traction plug 107 here, and with a common touch-protected connector housing 114 here, to form a common component and can thus be particularly simply and reliably handled and assembled. A connector element 112 is provided for connecting the on-board power supply plug 108. The connector elements 111, 112 are constructed for connecting at least one supply line 113 of the internal electrical device thereto, in particular a traction battery. In the illustrated exemplary embodiment, this at least one supply line 113 is formed by or on and/or in a traction battery connector housing 113, abbreviation: BJB. The BJB 113 is indicated in FIG. 5 and preferably moreover comprises switching devices, amongst other things, in particular contactors for switching the traction battery on and off.

Figure 2:
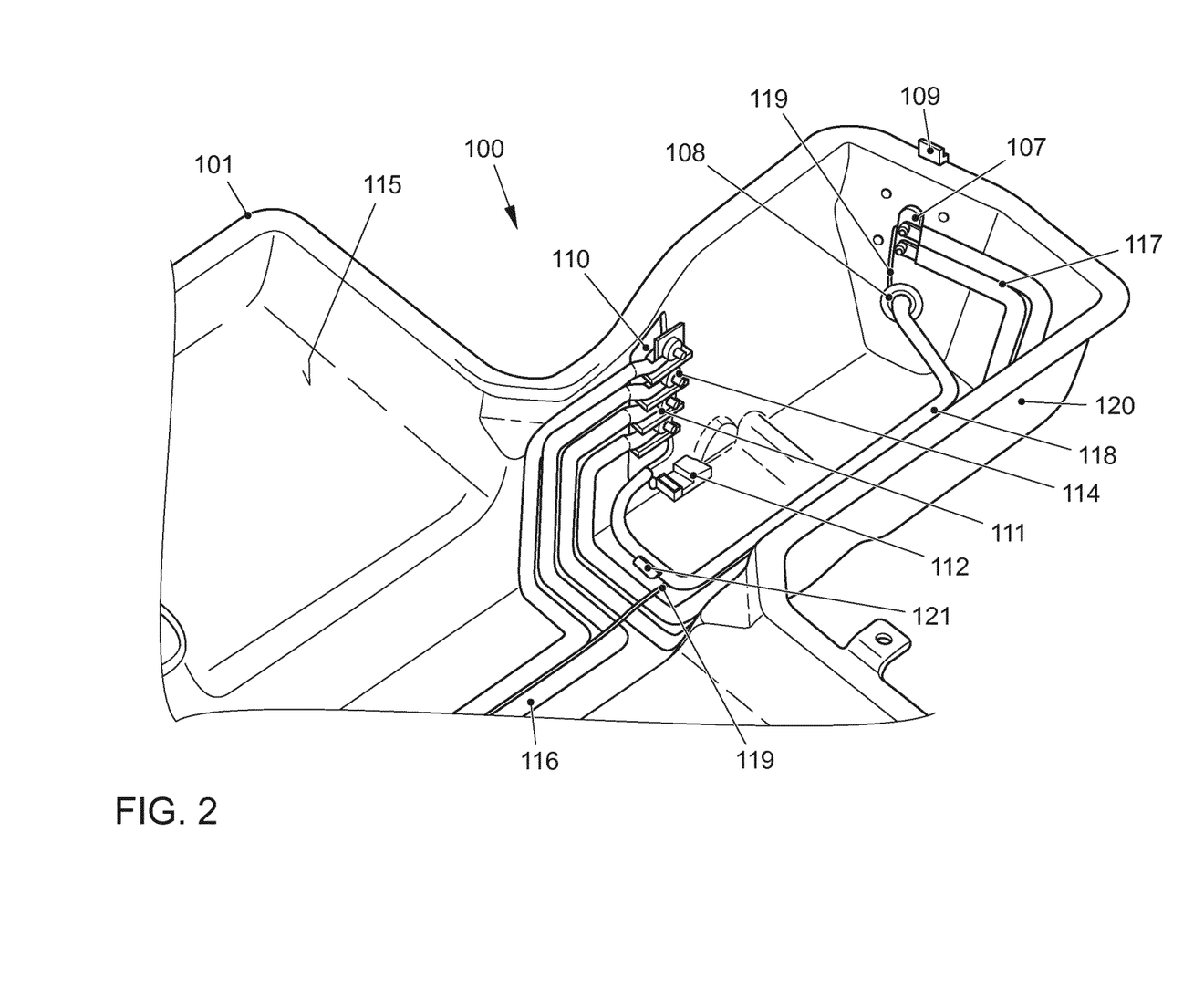
FIG. 2 an enlargement of a detail of the illustration according to FIG. 1.
Figure 3:
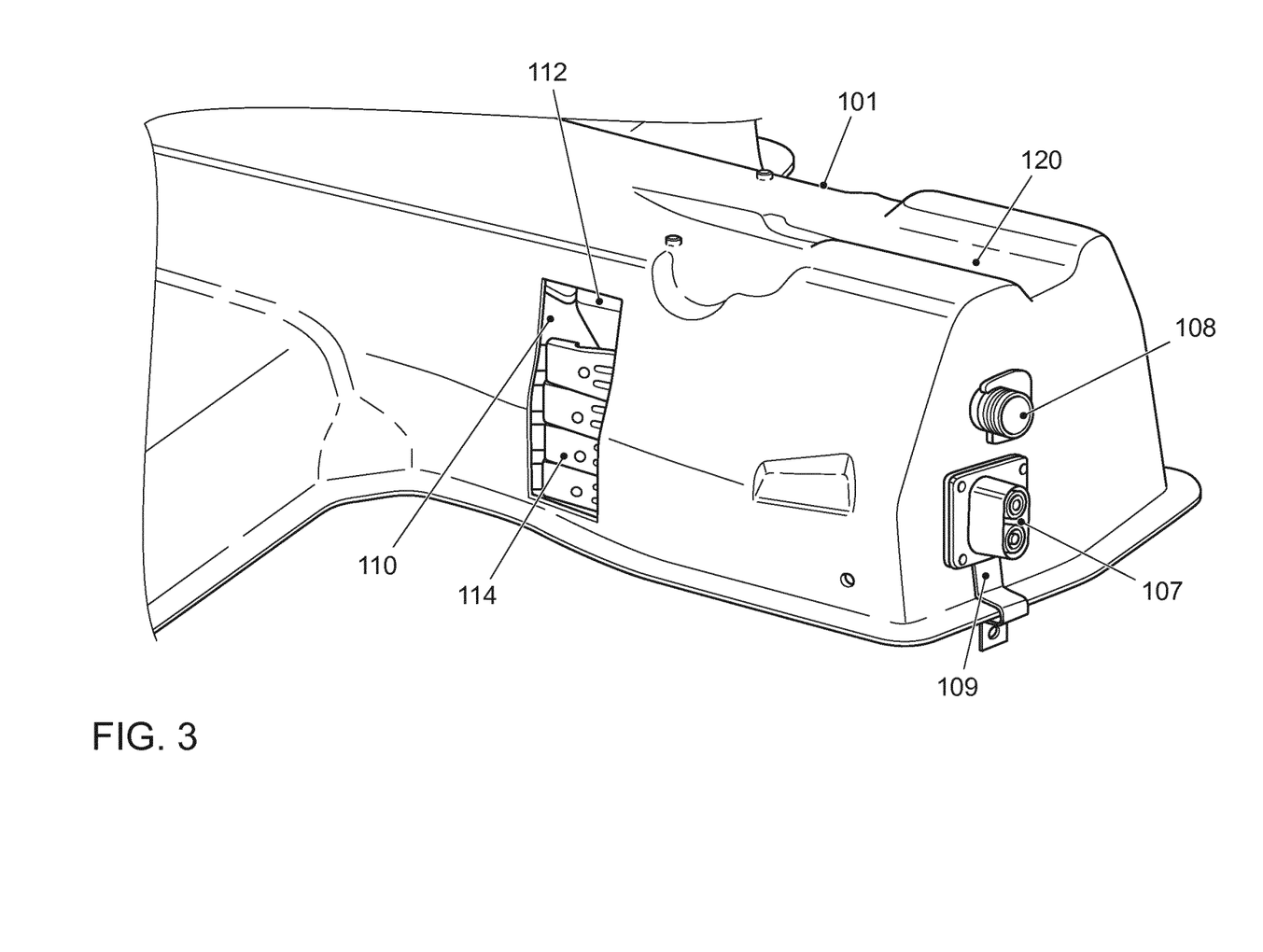
FIG. 3 a detail of the example of the housing element of FIG. 1 in a perspective plan view.
Figure 4:
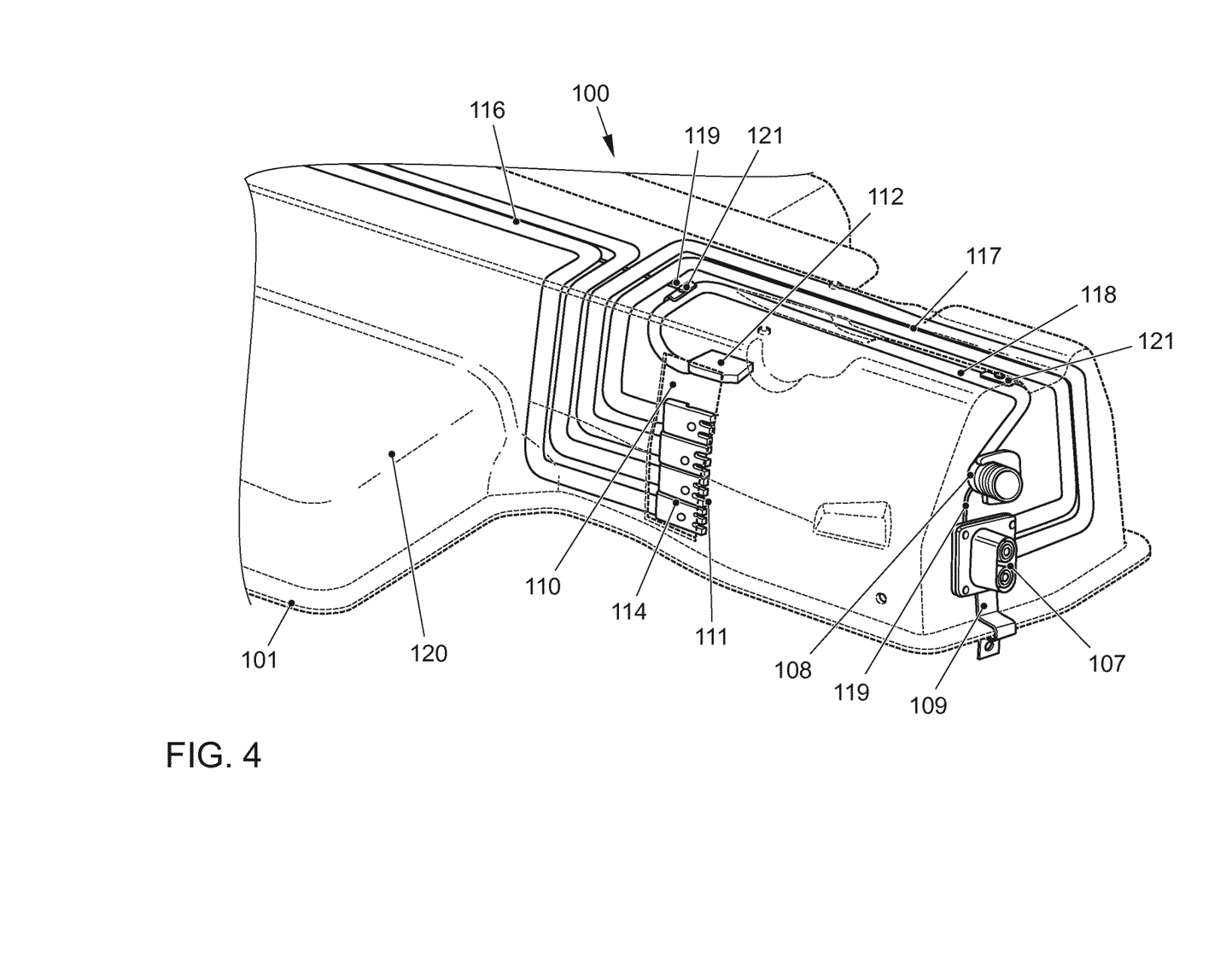
FIG. 4 the detail of the example of the housing element of FIG. 1 in the perspective plan view according to FIG. 3, but illustrated in a phantom view.

Line sections are arranged along an inner surface 115 of the wall of the hood-like housing element 101, in particular bonded there such that they are electrically insulated from one another and from any electrically conductive components of the housing element 101, and/or integrally formed in and/or on the material of the housing element 101. A first 116 of these line sections here is connected on one side to the first external electrical connecting element, i.e. the charging plug 106, and on the other side to the connector element(s) 111 provided for connecting the charging plug 106 in the touch-protected connector housing 114. A second 117 of the line sections is connected on one side to the second external electrical connecting element, i.e. the traction plug 107, and on the other side to the connector element(s) 111 provided for connecting the traction plug 107 in the touch-protected connector housing 114. A third 118 of the line sections is connected on one side to the third external electrical connecting element, i.e. the on-board power supply plug 108, and on the other side to the connector element 112 provided for connecting the on-board power supply plug 108. A so-called pilot line 119 is moreover guided from the on-board power supply plug 108 to the high-voltage plugs, i.e. to the charging plug 106 on the one hand and to the traction plug 107 on the other and, more precisely, likewise along the inner surface 115 of the wall of the hood-like housing element 101, as illustrated in FIGS. 2 and 4. The pilot line 119 leads to electrical contacts within the high-voltage plug 106, 107, which are closed when the relevant high-voltage plug is plugged in, i.e. when the relevant external electrical devices are connected. A high-voltage plug 106, 107 which is not plugged in is reported to a control, e.g. of a vehicle, via the pilot line 119 and the on-board power supply plug, so that the control prevents the traction battery from switching on, for example.

In the manner described, the external electrical connecting elements 106, 107, 108, the line sections 116, 117, 118 and the pilot line 119 as well as the connector elements 111, 112 are fixedly arranged on the housing element 101 and the connector elements 111, 112 are moreover arranged on the inside of the housing element 101, i.e. facing the inner surface 115 of the wall of the housing element 101, in the region of the assembly opening 110 in the housing element 101 such that they are accessible from an outer side 120 of the housing 102 or the housing element 101. Touch protection is not required here at the connections of the line sections 116, 117, 118 and the pilot line 119 with the external electrical connecting elements 106, 107, 108 and the connector elements 111, 112, which means that the design is made simpler and cheaper. An anti-twist device can be optionally provided, but is likewise not compulsory.

In the illustrated exemplary embodiment, the connector elements 111, 112 are connected directly to associated compatible contacts, i.e. external connectors, of the BJB 113 by means of plug and/or screw connections, without requiring the interconnection of further conductor structures such as line sections or the like. Simple assembly and a simple and economical design are achieved as a result. To achieve a completely gas- and/or fluid-tight housing 102, the assembly opening 110 can advantageously be closed by a cover-like or cover-shaped closing element (not illustrated). It is substantially easier, quicker and more economical to realize such a closing and, in particular, sealing of such a closing element on the otherwise finished housing 102 than it would be to assemble the external electrical connecting elements 106, 107, 108 in a gas- and/or fluid-tight manner on the already fully joined-together housing 102. It is also optionally possible to construct the invention with a housing which is not gas- and/or fluid-tight.

To produce, for example, a traction battery designed according to the invention for a vehicle, the components of the electrical connecting device 100 are firstly pre-assembled in or on the housing element 101 on the one hand and the internal electrical device of the traction battery, i.e. battery cells with wiring and accessories and also the BJB 113 are pre-assembled in the rest of the housing 105 on the other. To this end, for example, the line sections 116, 117, 118 and the pilot line 119 are already embedded in the material of the housing element 101 or applied, e.g. bonded, along the inner surface 115 of the wall of the housing element 101 when the housing element 101 is formed, e.g. by injection molding, deep drawing or the like, or at least virtually immediately afterwards. An arrangement and fastening of the third line section 118 with holding elements 121 on the inner surface 115 of the wall of the housing element 101 is illustrated as an option in FIG. 4. To this end, the housing element 101, which is designed for example in a hood-like manner, can be processed very conveniently in different assembly positions e.g. lying with the inner surface 115 facing upwards, whereby the manufacturing procedure is facilitated, simplified and accelerated. The charging plug 106, traction plug 107 and on-board power supply plug 108 are assembled and sealed in apertures of the housing element 101; moreover, the charging plug 106, traction plug 107, on-board power supply plug 108 and the connector elements 111, 112 are connected to the line sections 116, 117, 118 and the pilot line 119, optionally with the inclusion of an anti-twist device. For the further assembly procedure, the connector elements 111, 112 connected to the line sections 116, 117, 118, in part pre-assembled in the touch-protected connector housing 114, are fastened to or in a holding device which is preferably arranged directly on the housing element 101 in the region of the assembly opening 110. The connector elements 111, 112, and optionally additionally those ends of the line sections 116, 117, 118 which are connected thereto, are thus held projecting through the assembly opening 110 to the outside 120 of the housing element 101. The holding device can be provided temporarily, only during manufacture, or also permanently and can be constructed for example in the manner and/or form of a support and/or clip or as a molded part on the housing element 101 in the region of the assembly opening 110.

In this manufacturing stage, the now completed electrical connecting device 100 is checked with regard to all components and/or as a whole to ensure that it functions properly. A corresponding check is furthermore carried out for the internal electrical device of the traction battery, i.e. the battery cells with wiring and accessories and the BJB 113 in the rest of the housing 105.

The housing element 101 which is pre-fabricated in this manner with the electrical connecting device 100 is now joined together with the rest of the housing 105 and the internal electrical device of the traction battery which is assembled therein, i.e. the battery cells with wiring and accessories and the BJB 113, and preferably bonded in a gas-tight manner. Bonding is effected as a strip along mutually adjoining peripheral edges of the housing element 101 and the housing lower shell 103. The holding device ensures here that the connector elements 111, 112 do not abut against the internal electrical device as the hood-like housing element 101 is placed on, i.e. slipped over, the internal electrical device in the housing lower shell 103. This enables a seamless manufacturing sequence in spite of the internal electrical device making extensive use of the installation space in the housing 102.

The connector elements 111, 112 are then pushed through the assembly opening into the interior of the housing 102 and connected to the BJB 113 by a screw and/or plug connection, for example. The touch-protected housing 114 with the connector elements 111 is assembled or connected as a whole here. The connection is effected through the assembly opening 110. This is finally closed by the closing element, in particular a cover, e.g. sealed and screwed, bonded or latched.

The use of the tight installation space in the housing 102 is improved by the invention. If sealing points and components for the electrical connections to be produced are omitted or simplified, this saves on material and reduces costs. The manufacturing steps are simplified and therefore better suited to high-volume production. In particular, the degree of automation during manufacture is increased. The product design is more flexible. In particular, the external electrical connecting elements can be arranged more freely on the housing element without production-related restrictions, e.g. in the case of a traction battery.

LIST OF REFERENCE SIGNS

100 Electrical connecting device
101 Housing element
102 Housing
103 Housing lower shell
104 Supporting frame of 102
105 Rest of the housing: 103 together with 104
106 First external electrical connecting element: Charging plug
107 Second external electrical connecting element: Traction plug
108 Third external electrical connecting element: On-board power supply plug
109 Ground connection area
110 Assembly opening in 101
111 Connector elements for connecting 106 and 107 to 113
112 Connector element for connecting 108 to 113
113 Supply line of the internal electrical device (traction battery) in 102: Traction battery connector housing, abbreviation: BJB
114 Touch-protected connector housing for 111
115 Inner surface of the wall of 101
116 First line section from 106 to 111
117 Second line section from 107 to 111
118 Third line section from 108 to 112
119 Pilot line
120 Outside of 102 or 101
121 Holding element

The invention claimed is:

1. A housing, comprising:
a hood-shaped housing element and a housing lower shell together forming an enclosed space configured to house an internal electrical device;
an electrical connecting device for the internal electrical device in the housing, said electrical connecting device including:
an external electrical connecting element disposed on said housing element for connecting a supply line of the internal electrical device to an external electrical device outside the housing;
a line section disposed inside said housing element and having a first end electrically connected to said external electrical connecting element;
an internal connector element disposed inside said housing element adjacent an assembly opening formed in said housing element so as to be accessible from an outside of the housing; said external electrical connecting element, said line section, and said internal connector element being fixedly mounted to, or integrated in, said housing element; and said line section further having a second end, distal from said first end, directly connected to said connector element for electrically connecting to the supply line for supplying the internal electrical device; and wherein said assembly opening is closed off upon final assembly to render a gas-tight and/or fluid-tight housing encasing said internal electrical device and said internal connector element.

2. The housing according to claim 1, wherein the internal electrical device is disposed in the housing, the electrical device is a traction battery for a vehicle and said internal connector element is a traction battery connector housing (BJB) containing switching devices for selectively switching on and off a connection to said traction battery.

3. The housing according to claim 1, wherein said internal connector element that is connected to said at least one line section is directly connected to said supply line of the internal electrical device.

4. The housing according to claim 3, wherein said internal connector element is directly connected to the supply line by way of a plug and/or screw connection.

5. The housing according to claim 1, further comprising at least one holding element fastening said line section to said housing element.

6. The housing according to claim 1, wherein said line section is integrally formed in a material of said housing element.

7. The housing according to claim 6, wherein said line section is embedded in and/or injection molded into a plastic material of said housing element.

8. The housing according to claim 1, wherein said external electrical connecting element arranged on said housing element is configured for a detachable connection to the external electrical device arranged outside the housing.

9. The housing according to claim 8, wherein the detachable connection with the external electrical device arranged outside the housing is a pluggable connection.

10. An electrically operable vehicle, comprising the housing according to claim 1 and the internal electrical device disposed in the housing.

* * * * *